(12) United States Patent
Iwata et al.

(10) Patent No.: US 9,902,563 B2
(45) Date of Patent: Feb. 27, 2018

(54) CONVEYOR AND CONVEYING METHOD

(71) Applicants: Nissan Motor Co., Ltd., Yokohama-shi, Kanagawa (JP); Automotive Energy Supply Corporation, Zama-shi, Kanagawa (JP)

(72) Inventors: Takeshi Iwata, Fujisawa (JP); Yasufumi Okazaki, Yamato (JP); Keisuke Uekusa, Yokohama (JP); Osamu Tanimoto, Ayase (JP)

(73) Assignees: Nissan Motor Co., Ltd., Yokohama (JP); Automotive Energy Service Corporation, Zama (JP)

( * ) Notice: Subject to any disclaimer, the term of this patent is extended or adjusted under 35 U.S.C. 154(b) by 241 days.

(21) Appl. No.: 14/371,197

(22) PCT Filed: Feb. 13, 2013

(86) PCT No.: PCT/JP2013/053373
§ 371 (c)(1),
(2) Date: Jul. 9, 2014

(87) PCT Pub. No.: WO2013/122091
PCT Pub. Date: Aug. 22, 2013

(65) Prior Publication Data
US 2014/0353125 A1    Dec. 4, 2014

(30) Foreign Application Priority Data

Feb. 13, 2012    (JP) ................................. 2012-028371

(51) Int. Cl.
*B65G 35/04*    (2006.01)
*H01M 10/04*    (2006.01)
(Continued)

(52) U.S. Cl.
CPC ........ *B65G 35/04* (2013.01); *H01M 10/0404* (2013.01); *H01G 11/86* (2013.01); *H01M 10/0525* (2013.01)

(58) Field of Classification Search
CPC .............. B65G 35/04; H01M 10/0404; H01M 10/0525; H01G 11/86
See application file for complete search history.

(56) References Cited

U.S. PATENT DOCUMENTS 3,904,145 A  *  9/1975  Steinberger .......... G03B 27/587
                                                              226/195
3,918,995 A  *  11/1975  Palmer ..................... D04H 3/16
                                                              428/220

(Continued)

FOREIGN PATENT DOCUMENTS

EP           2815997 A1    12/2014
EP           2816649 A1    12/2014
(Continued)

*Primary Examiner* — Michael E Gallion
(74) *Attorney, Agent, or Firm* — Global IP Counselors, LLP

(57) ABSTRACT

A conveyor is provided with a supply roll, a corrective holding part and an additional holding part. The supply roll rotatably supports a belt-shaped cell material for an electrode or a separator. The corrective holding part conveys and holds the cell material fed out from the supply roll while bending a first side surface of the cell material that lies against an outer peripheral side of the supply roll into a concave shape. The additional holding part conveys and holds the cell material while bending a second side surface of the cell material into a concave shape. The holding parts include a curved contact surfaces that contact opposite side surface of the cell material. The curved contact surface of the corrective holding part has a radius of curvature that is less than a radius of curvature of the curved contact surface of the additional holding part.

7 Claims, 15 Drawing Sheets

(51) Int. Cl.
*H01M 10/0525* (2010.01)
*H01G 11/86* (2013.01)

(56) References Cited

U.S. PATENT DOCUMENTS

| | | | | |
|---|---|---|---|---|
| 3,982,710 | A * | 9/1976 | Teumer | B65H 23/1955 242/412.2 |
| 5,650,028 | A * | 7/1997 | Brandt | B44C 1/1712 156/238 |
| 5,697,573 | A * | 12/1997 | Fukuchi | B65H 20/32 242/412.2 |
| 6,035,667 | A * | 3/2000 | Watabe | B65H 54/06 242/154 |
| 6,435,446 | B1 * | 8/2002 | Matsuzawa | B65H 16/00 242/422.4 |
| 6,454,197 | B1 * | 9/2002 | Everett | B41J 15/04 242/334.4 |
| 6,497,384 | B1 * | 12/2002 | Fujiwara | B65H 18/14 242/527 |
| 6,547,229 | B1 | 4/2003 | Hanson et al. | |
| 6,585,846 | B1 * | 7/2003 | Hanson | B65H 37/002 156/264 |
| 7,722,684 | B2 * | 5/2010 | Mekala | H01M 4/8828 156/256 |
| 8,375,569 | B2 * | 2/2013 | Fukui | H01F 27/25 242/437.3 |
| 8,840,329 | B2 * | 9/2014 | Okada | B65H 23/06 400/614 |
| 9,276,284 | B2 * | 3/2016 | Iverson | |
| 2001/0054340 | A1 * | 12/2001 | Fujikata | B65H 23/26 83/14 |
| 2005/0061426 | A1 * | 3/2005 | Parker | B32B 37/003 156/264 |
| 2006/0289453 | A1 * | 12/2006 | Oh | H01M 2/26 219/469 |
| 2007/0145178 | A1 * | 6/2007 | Fischer | B41F 13/03 242/532 |
| 2011/0146064 | A1 * | 6/2011 | Feaver | H01M 2/1673 29/623.2 |
| 2014/0272543 | A1 * | 9/2014 | Devan | H01M 10/0436 429/162 |

FOREIGN PATENT DOCUMENTS

| | | |
|---|---|---|
| EP | 2816651 A1 | 12/2014 |
| JP | 5-74445 A | 3/1993 |
| JP | 8-215749 A | 8/1996 |
| JP | H9-180735 A | 7/1997 |
| JP | 10-310299 A | 11/1998 |
| JP | 11-171379 A | 6/1999 |
| JP | 11-316116 A | 11/1999 |
| JP | 2001-202986 A | 7/2001 |
| JP | 2003-059525 A | 2/2003 |
| JP | 2009-256052 A | 11/2009 |
| WO | 2011/018840 A1 | 2/2011 |

\* cited by examiner

CONVEYOR AND CONVEYING METHOD

CROSS-REFERENCE TO RELATED APPLICATIONS

This application is a U.S. National stage of International Application No. PCT/JP2013/053373, filed Feb. 13, 2013. This application claims priority to Japanese Patent Application No. 2012-028371, filed on Feb. 13, 2012. The entire disclosure of Japanese Patent Application No. 2012-028366 is hereby incorporated herein by reference.

BACKGROUND

Field of the Invention

The present invention relates to a conveyor and a conveying method for conveying a belt-shaped cell material that is a material from which electrodes or separators are cut out.

Background Information

Recently, batteries are being used which comprise an electrode assembly wherein a multiple positive electrodes and negative electrodes as electrodes are superposed together with separators in between. As a method for manufacturing the electrode assembly of such a cell, Japanese Laid-Open Patent Application No. 2009-256052, for example, discloses a method for manufacturing a roll-shaped electrode assembly by superposing belt-shaped cell material, which is the material of the electrodes and the separators, and winding the cell material around a winding shaft while the cell material is drawn out from a supply roll on which the cell material has been wound.

SUMMARY

However, when cell material supplied from a supply roll such as the one of Japanese Laid-Open Patent Application No. 2009-256052 is processed during the manufacturing of flat electrode assemblies in which flat electrodes and separators are stacked, creases remain in the cell material that had been wound on the supply roll, and there is a possibility of processing accuracy decreasing.

The present invention was devised in order to resolve the problems described above, and an object of the invention is to provide a conveyor and a conveying method that can correct creases in the supply roll to improve processing accuracy.

The conveyor of the present invention comprises: a supply roll on which a belt-shaped cell material is wound, the cell material being the material for an electrode or a separator; a corrective holding part, and another holding part. The corrective holding part conveyably holds the cell material, which is fed out from the supply roll, while bending one surface of the cell material that lies against the outer peripheral side of the supply roll into a concave shape. The other holding part holds the cell material in a conveyable manner while bending the other side of the cell material, which is different from the one side, into a concave shape. The radius of curvature of the surface of the corrective holding part that is in contact with the cell material is less than the radius of curvature of the surface of the other holding part that is in contact with the cell material.

BRIEF DESCRIPTION OF THE DRAWINGS

Referring now to the attached drawings which form a part of this original disclosure.

FIG. 19 is a plan view of the automatic joining section showing when a new supply roll is conveyed in.

DETAILED DESCRIPTION OF THE EMBODIMENTS

Figure 1:
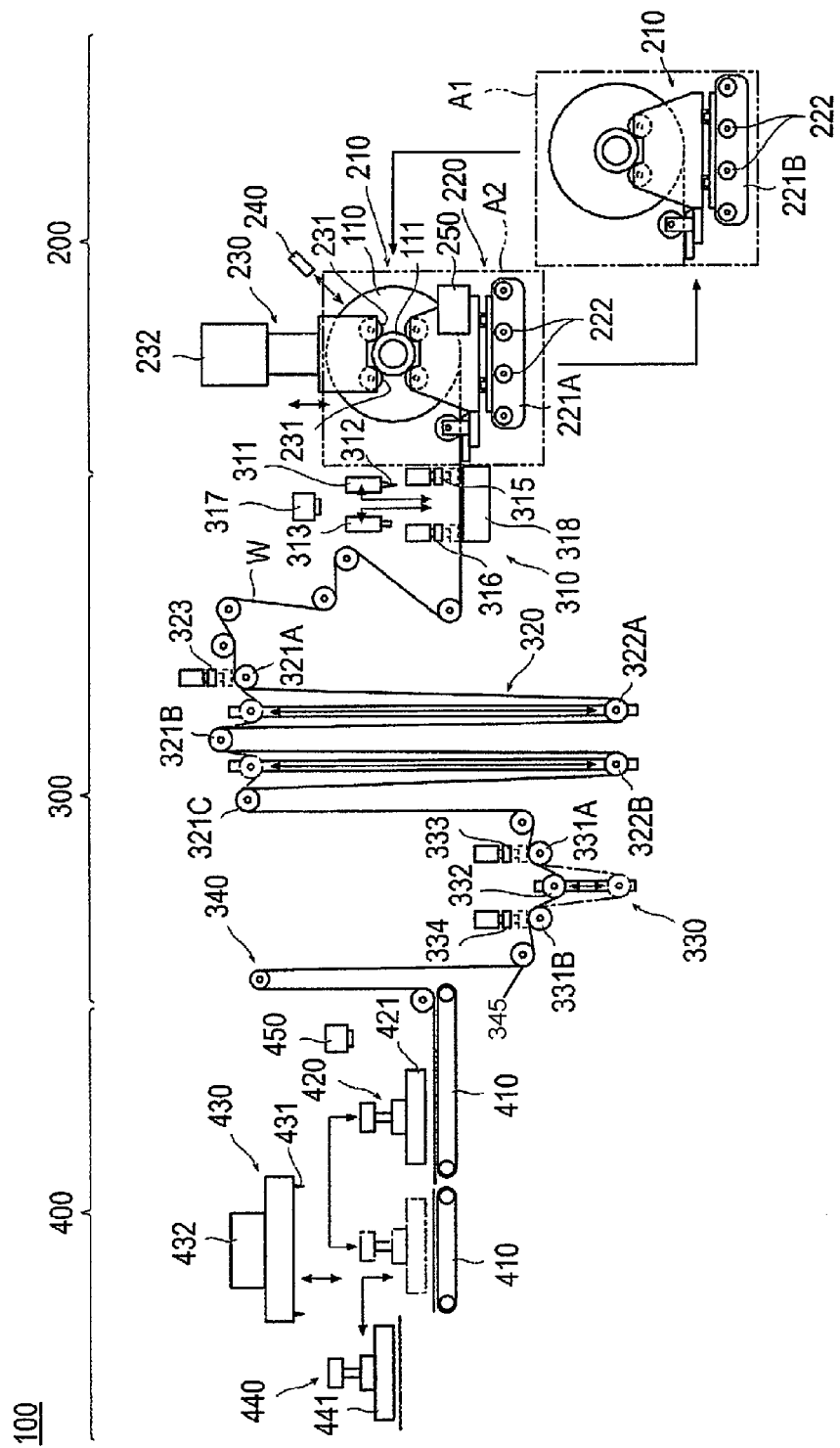
FIG. 1 is a schematic diagram showing a conveyor according to the present embodiment.

An embodiment of the present invention is described below with reference to the accompanying drawings. In the description of the drawings, the same elements are denoted by the same symbols, and redundant descriptions are omitted. Dimensional ratios in the drawings are exaggerated for the sake of the descriptions and are different from the actual ratios.

A conveyor 100 according to the present embodiment is an apparatus for cutting out electrodes from a belt-shape cell material W, which is a material for electrodes or separators constituting batteries, while the cell material W is conveyed by being drawn out from a supply roll 110 on which the cell material is wound, as shown in FIG. 1.

First, the cell 10 will be described with reference to FIGS. 2 and 3.

Figure 2:
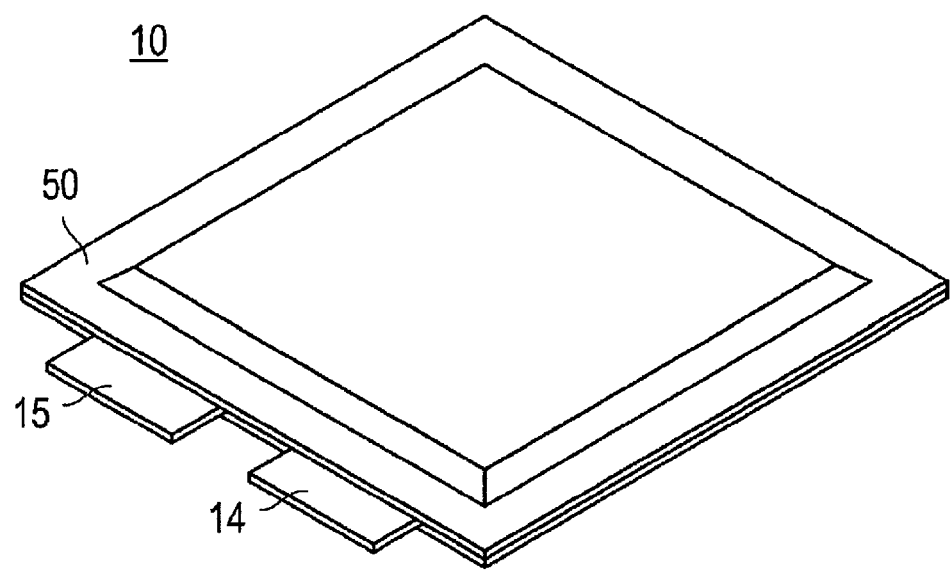
FIG. 2 is a perspective view showing a flat cell.
Figure 3:
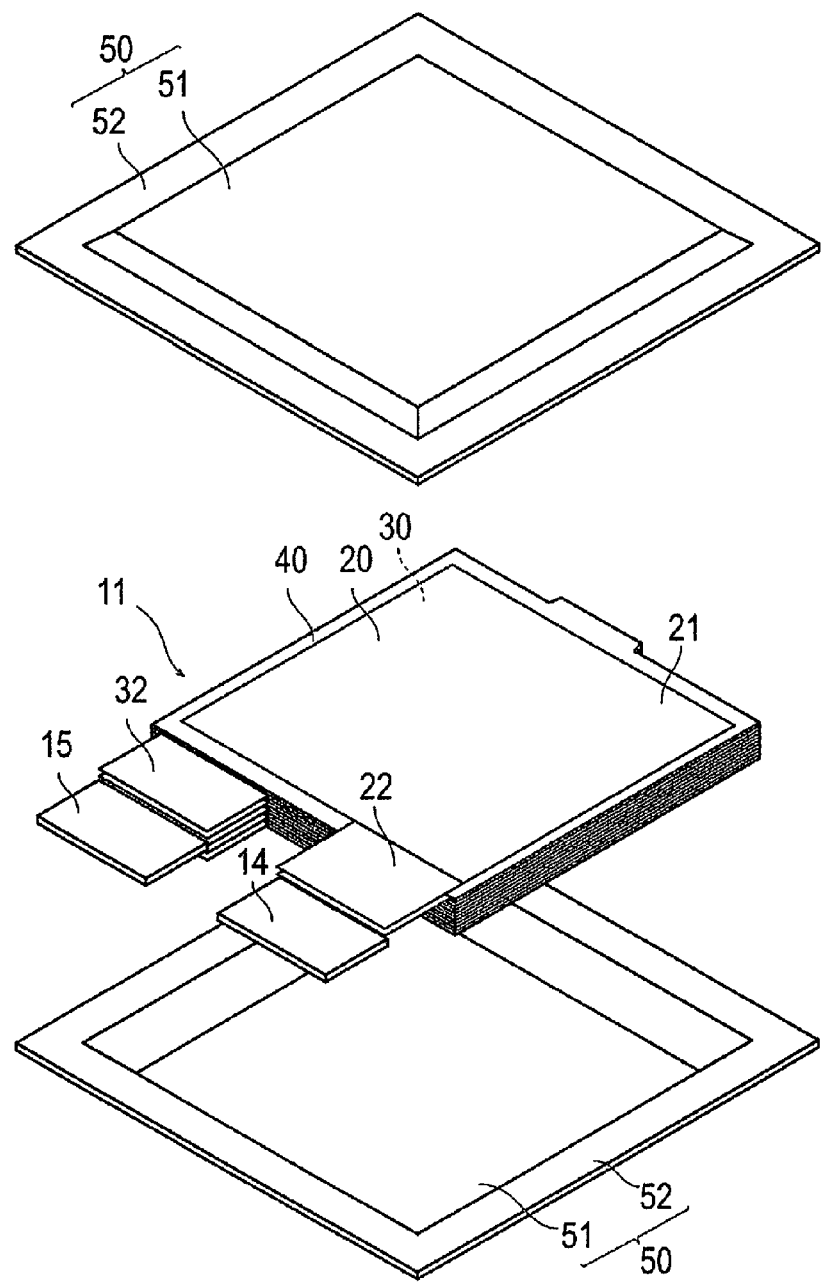
FIG. 3 is an exploded perspective view showing the flat cell.

The cell 10 is a flat lithium ion secondary cell, for example, in which a stacked electrode assembly 11 is stored together with an electrolytic solution inside an exterior member 50, as shown in FIGS. 2 and 3. The cell 10 has a positive electrode lead 14 and a negative electrode lead 15 led to the exterior out of the exterior member 50.

The stacked electrode assembly 11 is formed by sequentially stacking a positive electrode 20, a negative electrode 30, and a separator 40. The positive electrode 20 has a positive electrode active material layer composed of a lithium-transition metal complex oxide such as $LiMn_2O_4$, for example. The negative electrode 30 has a negative electrode active material layer composed of carbon and a lithium-transition metal complex oxide, for example. The separator 40 is formed from porous polyethylene (PE) that is breathable enough for electrolytes to permeate, for example.

The positive electrode 20 is formed into a substantially rectangular shape, and is made by forming positive electrode active material layers 21 on both sides of an extremely thin sheet-shaped positive electrode current collector. In the positive electrode 20, a positive electrode tab 22 connected to the positive electrode lead 14 is formed in the end without coating the positive electrode current collector with the positive electrode active material.

The negative electrode 30 is formed into a substantially rectangular shape, and is made by forming negative electrode active material layers on both sides of an extremely thin sheet-shaped negative electrode current collector. In the negative electrode 30, a negative electrode tab 32 connected to the negative electrode lead 15 is formed in the end without coating the negative electrode current collector with the negative electrode active material.

In terms of reducing weight and heat conductivity, the exterior member 50 is made of a sheet material such as a polymer-metal composite laminate film of aluminum, stainless steel, nickel, copper, or another metal (including alloys) coated with an insulator such as a polypropylene film. The exterior member 50 has a main body part 51 covering the stacked electrode assembly 11 and an outer peripheral part 52 extending from the peripheral edge of the main body part 51, and part or all of the outer peripheral part 52 is bonded by heat fusion.

Next, the conveyor 100 according to the present embodiment is described. In the present embodiment, the description is given using the positive electrode 20 as the element that is cut out, but the description applies also to the cutting out of the negative electrode 30 or the separator 40.

Figure 4:
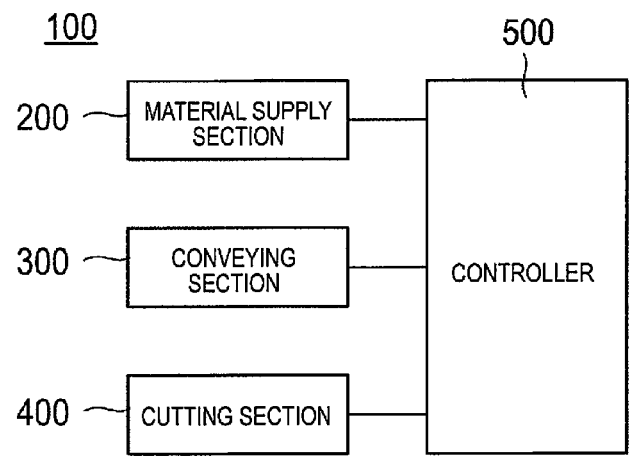
FIG. 4 is a schematic configuration diagram showing the conveyor according to the present embodiment.

A conveyor 100 comprises a material supply section 200 for supplying a belt-shaped cell material W, which is the material of the positive electrode 20, from the supply roll 110 around which the cell material W is wound, and a conveying section 300 for conveying the supplied cell material W while the cell material is folded back by a plurality of rollers (holding parts), as shown in FIGS. 1 and 4. The conveyor 100 further comprises a cutting section 400 (processing means) for cutting electrodes from the fed cell material W and conveying the electrodes, and a controller 500 for collectively controlling the entire conveyor 100.

The material supply section 200 comprises a roll support base 210 for rotatably holding the supply roll 110, a support base movement mechanism 220 for automatically moving the roll support base 210 toward or away from the conveying section 300, and brake force applying means 230 for applying brake force to the rotation of the supply roll 110. The material supply section 200 further comprises roll detection means 240 for measuring the thickness of the cell material W wound around the supply roll 110, and roll position correction means 250 for correcting the position of the supply roll 110.

Figure 5:
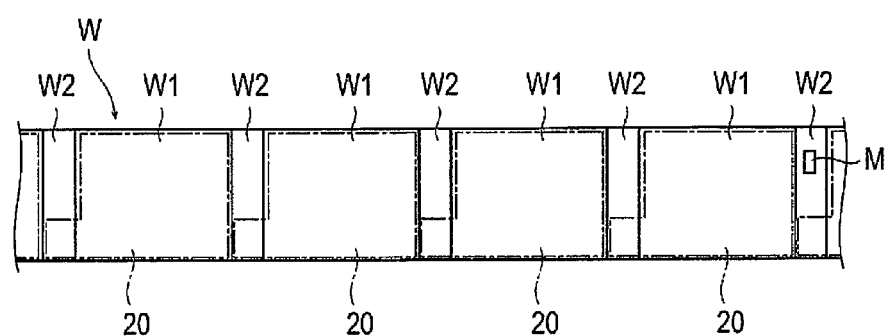
FIG. 5 is a plan view showing the cell material.

The supply roll 110 is formed by winding a fixed width of cell material W around a cylindrical core 111, the cell material being narrower in width than the core 111. The cell material W in the present embodiment, which is used for a positive electrode, contains an alternating arrangement of active material parts W1 which are electroconductive members as positive electrode current collectors coated with a positive electrode active material, and tab parts W2 which are not coated with a positive electrode active material, as shown in FIG. 5. Positive electrodes 20 are cut out from the cell material W as shown by the single-dash lines in FIG. 5, whereby part of each active material part W1 constitutes a positive electrode active material layer 21, and part of each tab part W2 constitutes a positive electrode tab 22. From the ending edge (the edge positioned on the inner peripheral side of the supply roll 110) of the cell material W, slightly toward the starting edge (the outer periphery of the supply roll 110), an ending edge mark M is provided for indicating that the ending edge is near when the cell material W is sequentially drawn out from the outer periphery. The ending edge mark M is formed by a through-hole or the like, for example.

Figure 6:
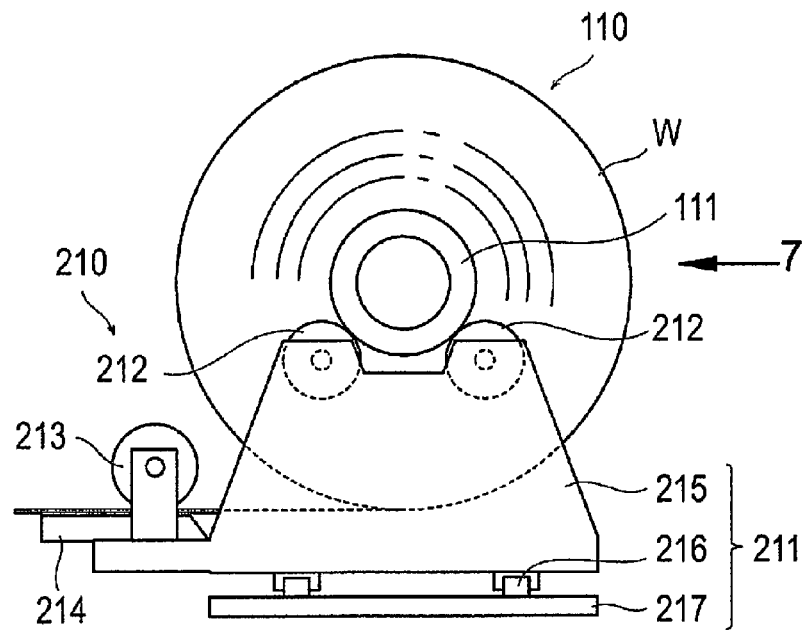
FIG. 6 is a plan view showing a roll support base for supporting the supply roll.
Figure 7:
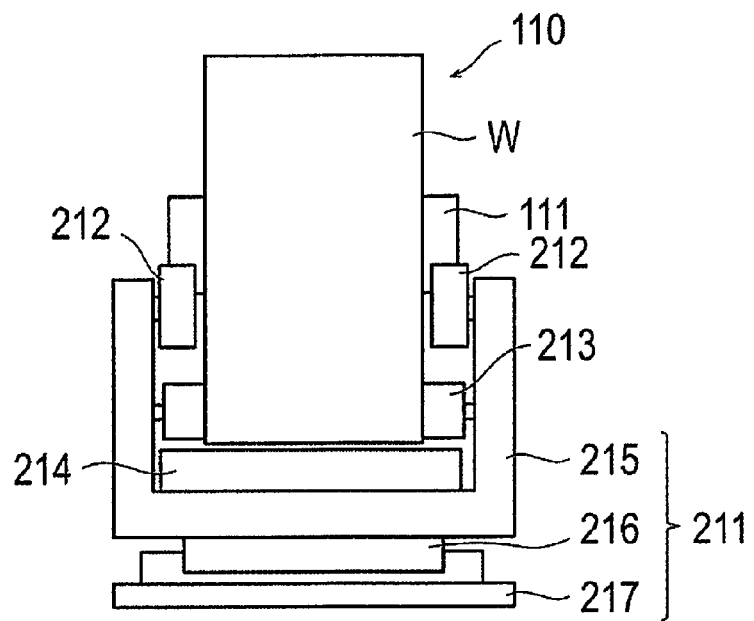
FIG. 7 is a plan view showing the roll support base observed from the direction of line 7 in FIG. 6.

The roll support base 210 comprises a support base main body part 211 constituting a frame, holding rollers 212 for rotatably holding the core 111, and a rotating roller 213 and a holding plate 214 in contact with the cell material W drawn out from the supply roll 110, as shown in FIGS. 6 and 7.

The support base main body part 211 comprises an upper support part 215 constituting a frame for holding the supply roll 110, a bottom base 216 provided to the bottom edge, and a linear guide 217 for moveably supporting the support base main body part 211 relative to the bottom base 216. The upper support part 215 is disposed in the upper part of the bottom base 216 via the linear guide 217, and thereby can move along the axial direction of the supply roll 110.

The holding rollers 212, which correspond to the respective ends of the core 111 of the supply roll 110, are aligned in twos to be substantially horizontal, apart from each other at a gap that is smaller than the diameter of the core 111, and are able to rotate freely relative to the upper support part 215. Therefore, the supply roll 110 can be rotatably supported by disposing the core 111 above and between two holding rollers 212 aligned substantially horizontally.

The rotating roller 213 is rotatably attached to the upper support part 215, and the cell material W drawn out from the supply roll 110 is held at a fixed height between the rotating roller and the holding plate 214 which is fixed to the upper support part 215.

The support base movement mechanism 220 comprises two moving bases 221A, 221B capable of moving up and down as well as moving horizontally as shown in FIG. 1, and movement mechanisms (not shown) for moving the moving bases 221A, 221B up and down as well as horizontally.

The roll support base 210 can be placed on both the moving bases 221A, 221B, the roll support base 210 placed at a convey in/out position A1 can be conveyed to a connecting position A2 adjacent to the conveying section 300, and the roll support base 210 can be conveyed from the connecting position A2 to the convey in/out position A1. The moving bases 221A, 221B comprise a plurality of support base movement rollers 222 that enable the roll support base 210 to move horizontally in order to make it easier to convey the roll support base 210 in and out. Both the moving bases 221A, 221B are capable of moving individually, and an old supply roll 110 from which the cell material W has been used up can be conveyed out by one moving base 221A, while a new supply roll 110 can be conveyed in by the other moving base 221B.

Figure 8:
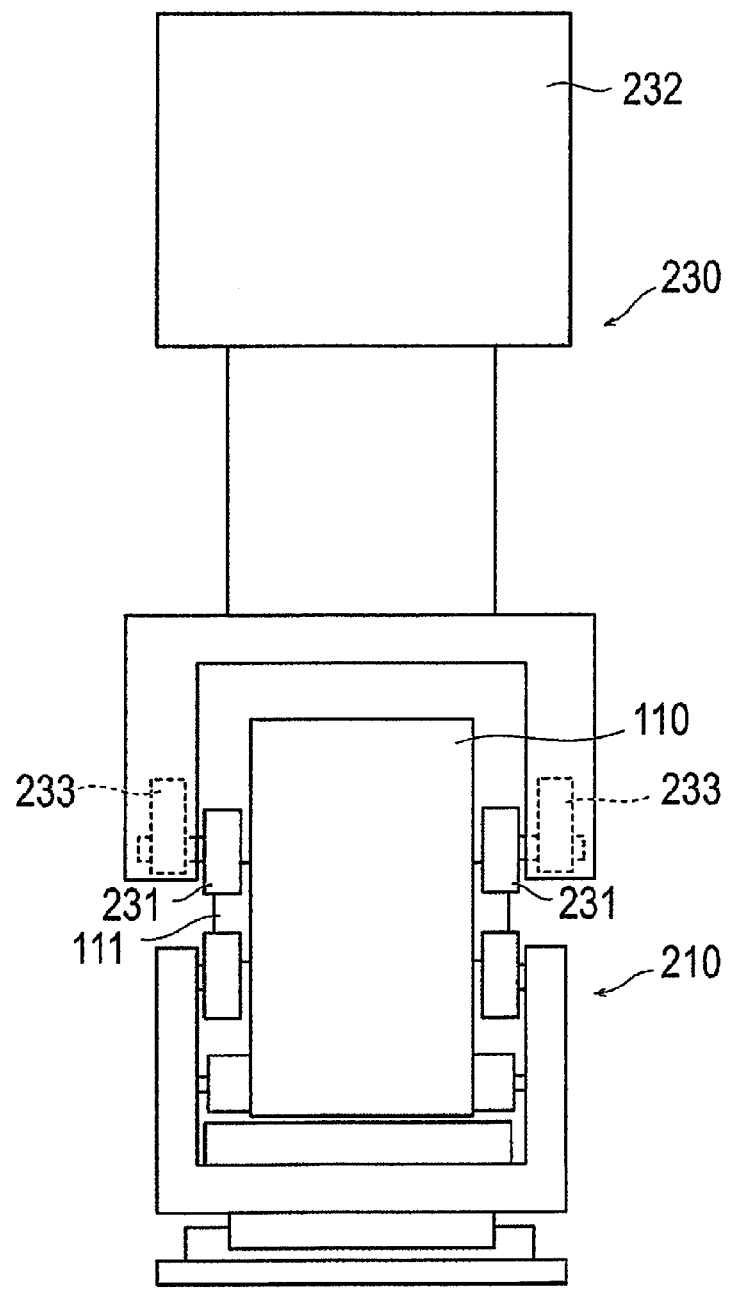
FIG. 8 is a plan view showing the roll support base supporting the supply roll and the brake force applying means.

The brake force applying means 230 is disposed above the roll support base 210, which is disposed in the connecting position A2, as shown in FIGS. 1 and 8. The brake force applying means 230 comprises braking rollers 231 capable of moving toward and away from both axial-direction ends of the core 111 of the supply roll 110 being supported on the roll support base 210, and a roller movement mechanism 232 for raising and lowering the braking rollers 231. The braking rollers 231 are connected to a braking mechanism 233 such as a brake capable of adjusting rotational load, and the rotational load is adjusted by the controller 500. The braking mechanism 233 can be a mechanical mechanism that reduces speed by converting kinetic energy into heat energy by friction, a mechanism that uses the electrical power of an electric motor or the like, or a mechanism that uses the motion resistance of a fluid, for example, but the braking mechanism is not particularly limited as long as the brake force can be controlled.

The roll detection means 240 is a laser displacement gauge disposed on the radial-direction outer side of the supply roll 110, facing the area where the cell material W is wound on the supply roll 110 supported on the roll support base 210 disposed in the connecting position A2, as shown in FIG. 1. The roll detection means 240 detects the distance to the supply roll 110 and transmits a detected signal to the controller 500. From the detected signal, the controller 500 can calculate the remaining amount of the cell material W on the supply roll 110. The roll detection means 240 is not limited to a laser displacement gauge as long as it can specify the remaining amount of the cell material W in the supply roll 110, and may be a displacement gauge that uses means other than a laser, a weight scale, or an image device such as a camera, for example.

The roll position correction means 250 comprises a drive source such as a motor or a cylinder. Controlled by the controller 500, the roll position correction means 250 pushes on and moves the upper support part 215 in a horizontal direction orthogonal to the conveying direction, the upper support part being moveably supported by the linear guide 217 of the roll support base 210.

The conveying section 300 comprises an automatic joining section 310 for joining another new cell material W to the already conveyed cell material W, a buffer section 320 capable or lengthening and shortening the conveyed route of the cell material W, and a draw-out section 330 (draw-out means) for intermittently drawing out fixed lengths of the cell material W. Furthermore, the conveying section 300 comprises a corrective roller 340 (corrective holding part) for correcting bending in the cell material W.

Figure 22:
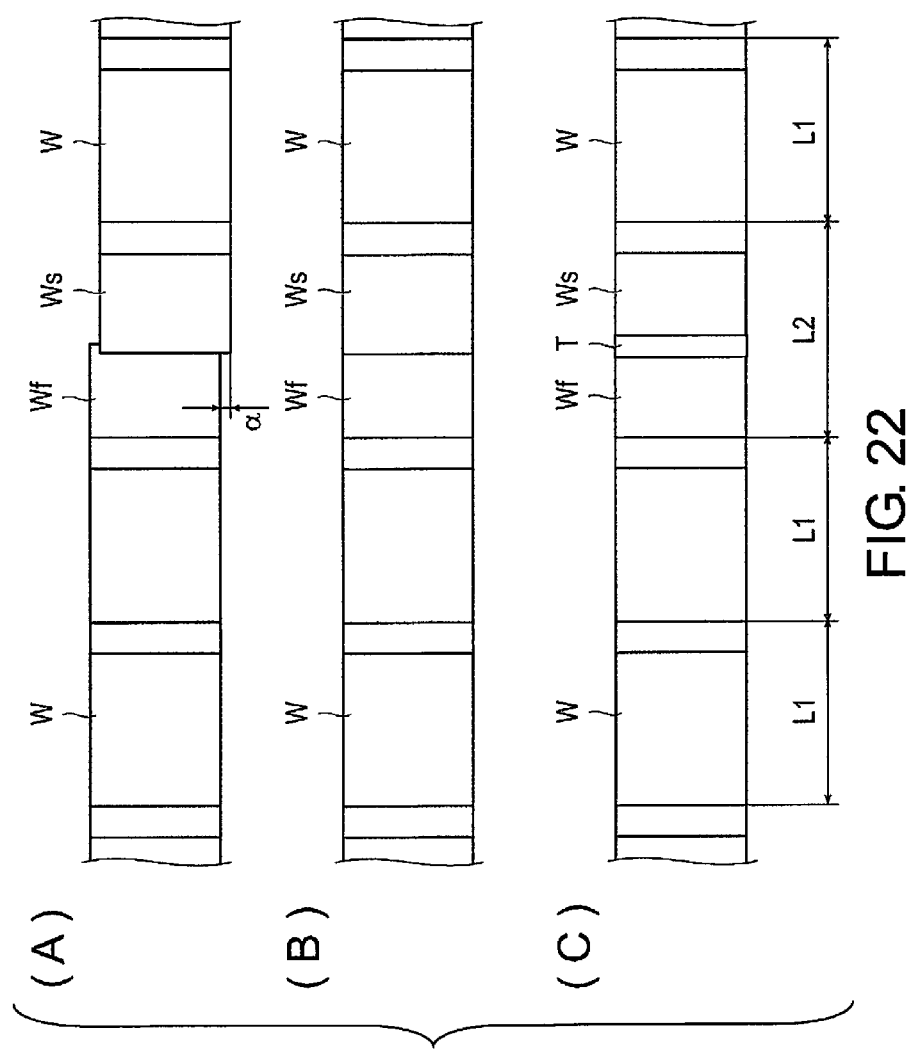
FIG. 22 are plan views showing previous cell material and new cell material, (A) showing a cell material before joining is performed, (B) showing a cell material when the position is corrected, and (C) showing a cell material after joining has been performed.

The automatic joining section 310 is provided so as to be capable of linking with the roll support base 210 on the moving bases 221A, 221B. The automatic joining section 310 has the function of automatically joining the end edge Wf of a pre-replacement cell material W with the starting edge Ws of a post-replacement cell material W, when the cell material W of the supply roll 110 is at an end and a new supply roll 110 is to be replaced, as shown in FIG. 22(A). The action of the automatic joining section 310 is controlled by the controller 500.

The automatic joining section 310 comprises a cutting part 311 for cutting the cell material W, a bonding part 313 for bonding cell materials W together, a joining section first clamp 315, a joining section second clamp 316, a first imaging part 317, and a receiving part 318 for supporting the cell material W from below, as shown in FIG. 1.

The cutting part 311 comprises a sharp cutting blade 312 that can move toward or away from the cell material W from above, and that cuts the cell material W by moving toward.

The bonding part 313 comprises a tape-affixing mechanism 314 that can move toward and away from the cell material W from above, and that affixes tape T coated on one side with a bonding agent (an adhesive) between the ending edge Wf of the previous cell material W and the starting edge Ws of the next cell material W. The tape-affixing mechanism 314 is a mechanism that presses and affixes the tape T while sequentially drawing out the tape from the roll on which the tape T is wound, for example. The configuration of the bonding part 313 is not limited as long as it is capable of bonding cell materials W together.

The joining section first clamp 315, which is disposed upstream of the cutting part 311 and the bonding part 313 and which is capable of moving toward and away from the cell material W from above, can sandwich and fix the cell material W with the receiving part 318 below.

The joining section second clamp 316, which is disposed downstream of the cutting part 311 and the bonding part 313 and which is capable of moving toward and away from the cell material W from above, can sandwich and fix the cell material W with the receiving part 318 below.

The first imaging part 317 is provided so as to be capable of observing the cell material W from above, and is capable of transmitting captured images to the controller 500. In an image captured by the first imaging part 317, the ending edge mark M of the cell material W is distinguished and used in order to specify the replacement time of the supply roll 110. Furthermore, the image captured by the first imaging part 317 is used in order to specify misalignment α (see FIG. 22(A)) of the starting edge Ws of the post-replacement cell material W, in the width direction relative to the ending edge Wf of the pre-replacement cell material W, when the supply roll 110 is being exchanged. The specified misalignment α is used as the amount by which the supply roll 110 is corrected by the roll position correction means 250.

The buffer section 320 comprises fixing rollers 321A, 321B, 321C which are rotatably provided to fixed positions and which hold the cell material W so as to allow the cell material to be conveyed, and rotatable buffer rollers 322A, 322B which are provided to be capable of moving and which hold the cell material W so as to allow the cell material to be conveyed. The buffer section further 320 comprises a buffer section clamp 323 for holding the cell material W.

The three fixing rollers 321A, 321B, 321C are disposed in substantially horizontal alignment, and the two buffer rollers 322A, 322B, which are capable of simultaneously moving up and down, are disposed so as to be positioned alternately between the three fixing rollers 321A, 321B, 321C. The buffer rollers 322A, 322B can be moved up and down by a raising/lowering mechanism driven by a motor, a cylinder, or the like, and the movement is controlled by the controller 500. When the buffer rollers 322A, 322B are lowered, the conveying route is lengthened, and when the buffer rollers 322A, 322B are raised, the conveying route is shortened.

The buffer section clamp 323 is provided so as to be capable of moving toward and away from the upstream fixing roller 321A, and the cell material W can be sandwiched and fixed between the buffer section clamp and the fixing roller 321A.

The buffer rollers 322A, 322B are usually positioned at the lower end, and when the supply roll 110 is replaced, the buffer rollers move upward in a state in which the cell material W is held between the buffer section clamp 323 and the fixing roller 321A and the supply of the cell material W from upstream is stopped. The conveying route is thereby shortened, the shortened section of cell material W can be fed downstream, and the supply roll 110 can be replaced on the upstream side without stopping the cutting of the cell material W on the downstream side.

The draw-out section 330 comprises two fixing rollers 331A, 331B which are provided so as to be capable of rotating in fixed positions and which hold the cell material W so as to allow the cell material to be conveyed, and one draw-out roller 332 which is provided so as to be capable of moving and rotating and which holds the cell material W so as to allow the cell material to be conveyed. Furthermore, the draw-out section 330 comprises a draw-out section first clamp 333 and a draw-out section second clamp 334 for holding the cell material W.

The fixing rollers 331A, 331B are disposed in horizontal alignment, and the one draw-out roller 332 capable of moving up and down is disposed so as to be positioned between the two fixing rollers 331A, 331B. The draw-out roller 332 is capable of being moved up and down by a raising/lowering mechanism driven by a motor, a cylinder, or the like, and the movement is controlled by the controller 500. When the draw-out roller 332 is lowered, the conveying route is lengthened, and the when the draw-out roller 332 is raised, the conveying routed is shortened.

The draw-out section first clamp 333, which is provided so as to be capable of moving toward and away from the upstream fixing roller 331A, can sandwich and fix the cell material W with the fixing roller 331A. The draw-out section second clamp 334, which is provided so as to be capable of moving toward and away from the downstream fixing roller 331B, can sandwich and fix the cell material W with the fixing roller 331B.

The draw-out section 330 can intermittently draw out fixed lengths of the cell material W from the supply roll 110, by interlocking the draw-out roller 332, the draw-out section first clamp 333, and the draw-out section second clamp 334.

The corrective roller 340, which is provided between the draw-out section 330 and the cutting section 400 and which is a rotatable roller for holding the cell material W so as to allow the cell material to be conveyed, has the function of correcting winding creases in the cell material W which has bent due to being wound on the supply roll 110. The corrective roller 340 conveys the cell material W while bending the convex shapes of the creases into concave shapes, by being in contact with the one surface of the cell material that lies against the outer peripheral side when the cell material is wound on the supply roll 110, i.e. the surface in which the creases are convex. The outer surface of the corrective roller 340 is formed with a smaller radius of curvature than the outer surface of the other roller provided in the conveying route, which are in contact with the other surface of the cell material W that lies against the inner peripheral side when the cell material is wound on the supply roll 110, i.e. the surface in which the creases are concave. The cell material W in contact with the corrective roller 340 thereby bends in the opposite direction of the creases with a smaller radius of curvature than when the cell material is in contact with the other roller in contact with the opposite surface, and the creases in the cell material W are corrected.

In the corrective roller 340, the fold-back angle, which is the difference between the angle of the cell material W entering the corrective roller 340 and the angle of the cell material W exiting the corrective roller 340, is approximately 180 degrees. The fold-back angle is preferably between 90 degrees and 180 degrees inclusive, but the fold-back angle may be less than 90 degrees and may also exceed 180 degrees if the cell material W entering the corrective roller 340 and the exiting cell material W do not interfere with each other. Increasing the fold-back angle as much as possible further improves the effect of correcting creases in the bent cell material W.

The cutting section 400 comprises receiving bases 410 for receiving the bottom surface of the cell material W, a suction-holding conveying section 420 for suction-holding and moving the cell material W, and an electrode punching section 430 for punching and cutting out a positive electrode 20 from the cell material W. Furthermore, the cutting section 400 comprises a suction-holding convey-out part 440 for suction-holding and conveying out the cut out positive electrode 20, and a second imaging part 450.

The suction-holding conveying section 420 comprises a suction-holding head 421 for exerting suction force by negative pressure due to being connected to a negative pressure supply source (not shown), the suction-holding head being installed on a robot hand (not shown) controlled by the controller 500 and being capable of moving.

The electrode punching section 430 comprises a cutting blade 431 that corresponds to the shape of the cut out positive electrode 20, and a press device 432 controlled by the controller 500 to raise and lower the cutting blade 431.

The suction-holding convey-out part 440 comprises a suction-holding head 441 for exerting suction force by negative pressure due to being connected to a negative pressure supply source (not shown), the suction-holding head being installed on a robot hand (not shown) controlled by the controller 500 and being capable of moving.

The second imaging part 450 is provided so as to be capable of observing the cell material W from above, and is capable of transmitting captured images to the controller 500. In an image captured by the second imaging part 450, active material parts W1 and tab parts W2 of the cell material W are distinguished (see FIG. 5), and are used in order to specify areas bonded by the automatic joining section 310 from differences in the lengths of the active material parts W1 along the conveying direction. When an area bonded by the automatic joining section 310 is specified, the distance the cell material W is conveyed by the suction-holding convey-out part 440 is altered according to the specified conveying-directional length, and the following cell material W is cut out in the proper position. An electrode containing the area bonded by the automatic joining section 310 is removed in a subsequent step.

Next, the action of the conveyor 100 according to the present embodiment is described.

Figure 9:
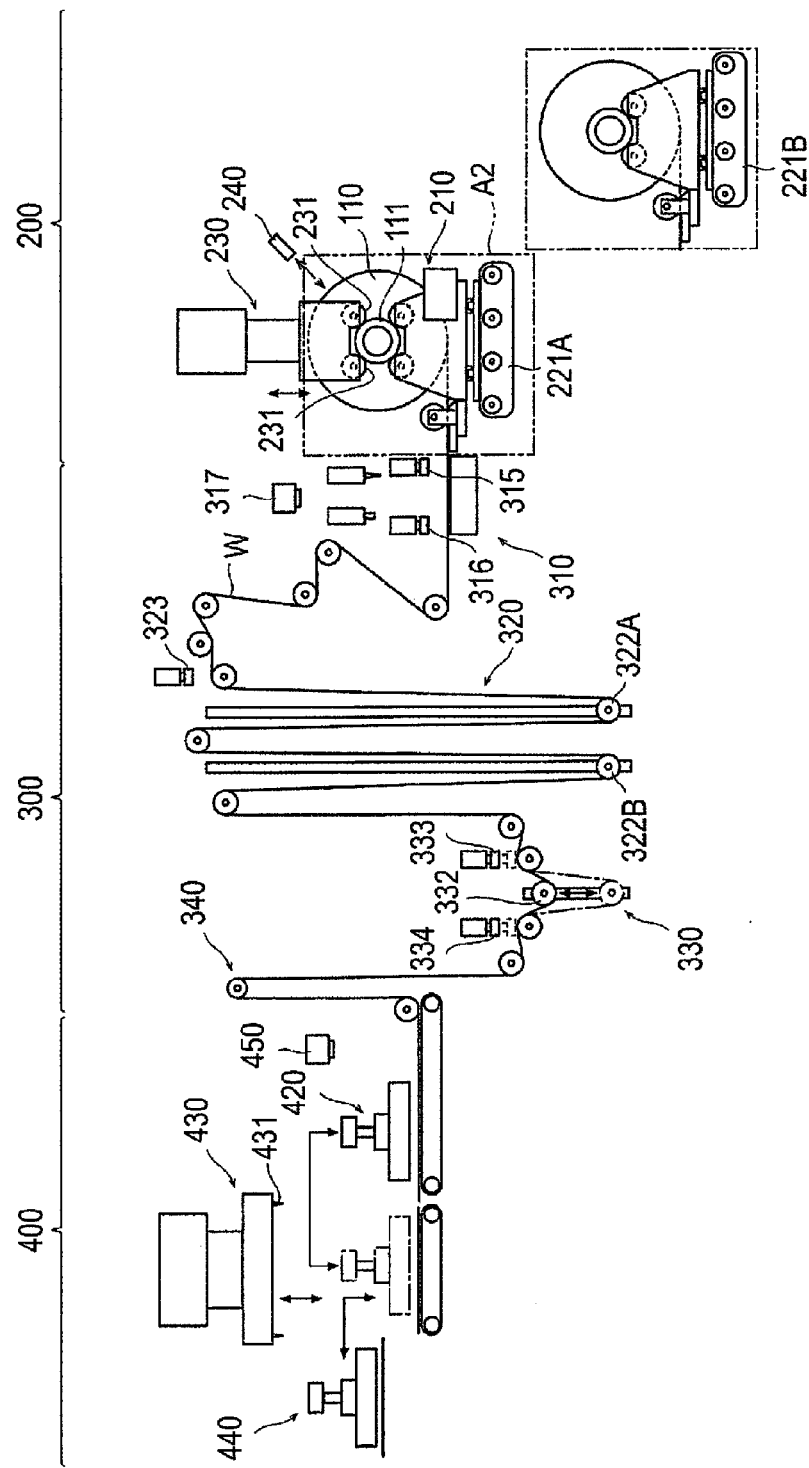
FIG. 9 is a plan view for describing the action of the conveyor according to the present embodiment.

The conveyor 100 is usually used while the roll support base 210 on the moving base 221A (or 221B) is positioned in the connecting position A2 and linked with the conveying section 300, as shown in FIG. 9. At this time, the buffer rollers 322A, 322B are positioned at the lower end, and the joining section first clamp 315, the joining section second clamp 316, and the buffer section clamp 323 are not fixing the cell material W in place. The cell material W extends from the roll support base 210, through the automatic joining section 310, the buffer section 320, and the draw-out section 330, to the cutting section 400.

In the supply roll 110 of the roll support base 210, the core 111 is rotatably held by the holding rollers 212, and the core 111 is in contact with the braking rollers 231 of the brake force applying means 230. The brake force of the braking rollers 231 is adjusted by the controller 500 in accordance with the distance to the supply roll 110 as detected by the roll detection means 240. The brake force is adjusted so as to decrease as the cell material W of the supply roll 110 lessens.

Figure 10:
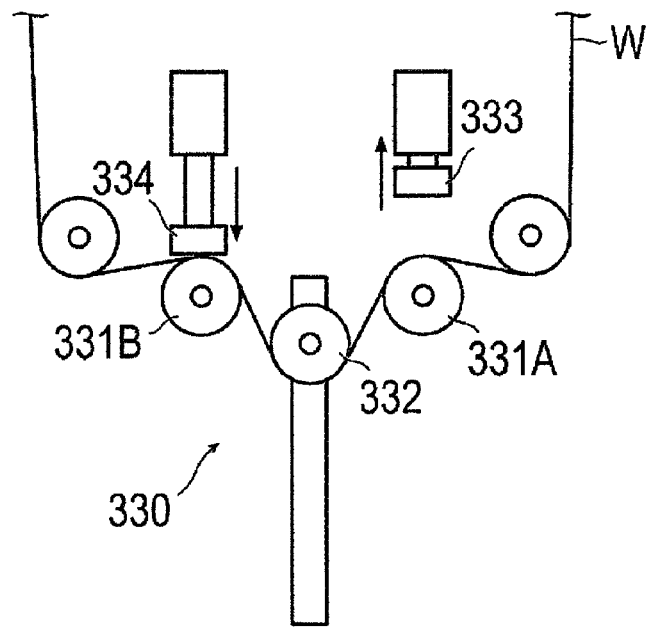
FIG. 10 is a plan view showing immediately before the cell material is drawn out from the upstream side by the draw-out section.
Figure 11:
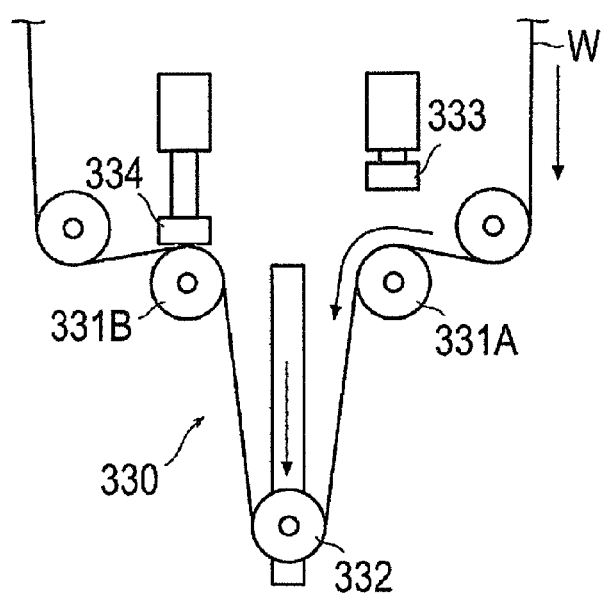
FIG. 11 is a plan view showing when the cell material is being drawn out from the upstream side by the draw-out section.

In a state in which the cell material W is fixed in place by the draw-out section second clamp 334 and the cell material W is not fixed in place by the draw-out section first clamp 333 as shown in FIG. 10, the cell material is moved under the draw-out roller 332 positioned above, and the length of the conveying route is lengthened. At this time, the cell material W downstream of the draw-out roller 332 does not move due to being fixed in place by the draw-out section second clamp 334, and the cell material W is drawn out from the upstream supply roll 110 in accordance with the change in the conveying route length as shown in FIG. 11.

When the draw-out roller 332 reaches the lower end, the cell material W stops being drawn out from the supply roll 110. At this time, the supply roll 110 would continue to rotate due to inertial force, but because brake force is being applied by the brake force applying means 230, the rotation of the supply roll 110 stops simultaneously with the stopping of the movement of the draw-out roller 332. Specifically, the brake force applied by the brake force applying means 230 is set so as to stop the rotation of the supply roll 110 simultaneously with the stopping of the movement of the draw-out roller 332. Such brake force, which depends on the inertial moment of the supply roll 110, decreases as the cell material W is drawn out from the supply roll 110. Specifically, when the brake force is set so that the supply roll 110, having much newly-replaced cell material W wound thereon, stops simultaneously with the stopping of the draw-out roller 332, the brake force becomes excessive and pulling the cell material out becomes difficult when the cell material W has been drawn out and the inertial moment of the supply roll 110 has decreased. Conversely, when the brake force is set so that the supply roll 110, from which some amount of cell material W has been drawn out, stops simultaneously with the stopping of the draw-out roller 332, a newly replaced supply roll 110 will have a large inertial moment and brake force will be insufficient. When the brake force is insufficient, the rotation of the supply roll 110 does not stop even if the draw-out roller 332 stops, more cell material W than necessary is supplied, and the cell material W slackens. Therefore, the brake force is adjusted by the controller 500 in accordance with the distance to the supply roll 110 as detected by the roll detection means 240, whereby the brake force does not depend on changes in the inertial moment of the supply roll 110, and the supply roll 110 can be intermittently rotated in a satisfactory manner.

Figure 12:
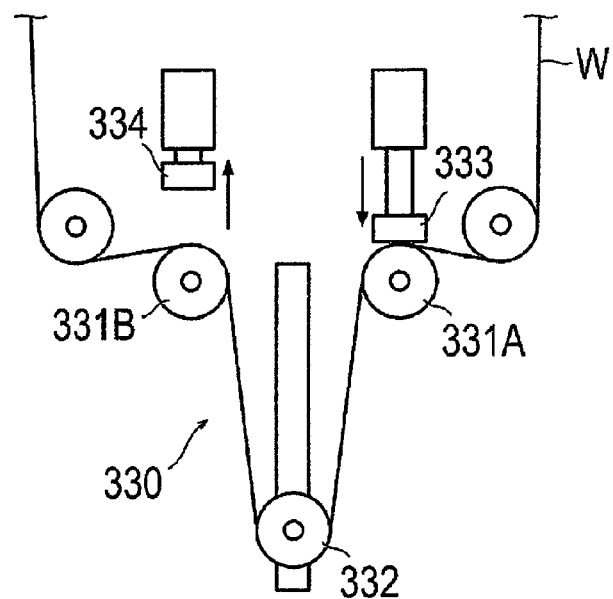
FIG. 12 is a plan view showing immediately before the cell material is conveyed to the downstream side by the draw-out section.
Figure 13:
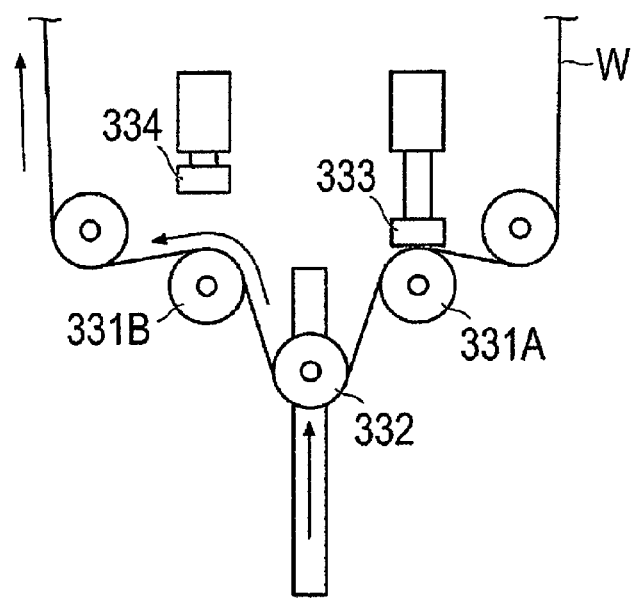
FIG. 13 is a plan view showing when the cell material is being conveyed to the downstream side by the draw-out section.
Figure 14:
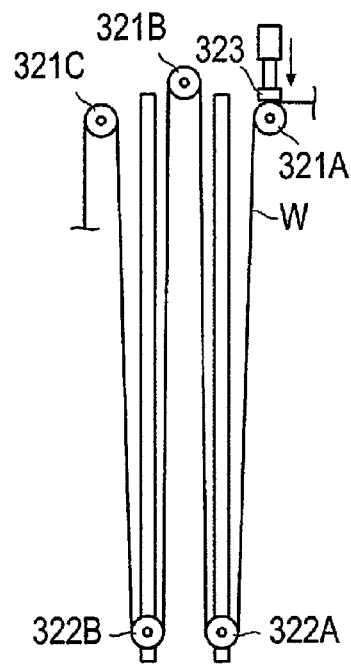
FIG. 14 is a plan view showing when the cell material is fixed in place by a buffer section clamp.

When the draw-out roller 332 reaches the lower end, the cell material W is fixed in place by the draw-out section first clamp 333, and the fixing of the cell material W by the draw-out section second clamp 334 is released, as shown in FIG. 12. The suction-holding conveying section 420 of the cutting section 400 holds the cell material W by suction, and the cell material W is moved in the conveying direction and disposed underneath the electrode punching section 430 (see FIG. 9). Because the draw-out section first clamp 333 is fixing the cell material W in place at this time, the cell material W upstream of the draw-out section first clamp 333 does not move, the conveying route length is shortened by the rising of the draw-out roller 332, and a predetermined length of cell material W is drawn out downstream from the conveying section 300, as shown in FIG. 14.

Because the corrective roller 340 is provided on the downstream side of the cutting section 400, creases are corrected so that the cell material W becomes nearly flat. The cell material W can thereby be suction-held in a satisfactory manner by the suction-holding conveying section 420, and the positive electrode 20 can be suction-held by the suction-holding convey-out part 440 in a satisfactory manner. Furthermore, in the cell material W held on the corrective roller 340, tension is constantly maintained throughout all the time periods of the repeated intermittent draw-out actions, there is no sagging in the cell material W on the corrective roller 340, and creases are satisfactorily corrected.

Next, the press device 432 is actuated, lowering the cutting blade 431, and the positive electrode 20 is cut out from the cell material W. The cutting blade 431 is then raised, the positive electrode 20 is held by suction by the suction-holding convey-out part 440, and the positive electrode 20 is conveyed out to the next step.

After the draw-out roller 332 has risen, the state shown in FIG. 10 is again enacted, wherein the cell material W is fixed in place by the draw-out section second clamp 334 and the cell material W is not fixed in place by the draw-out section first clamp 333. The draw-out roller 332 positioned above is again moved downward, and the cell material W is drawn out from the supply roll 110 upstream, in the same manner as described above. Thus, the actions of the draw-out roller 332, the draw-out section first clamp 333, and the draw-out section second clamp 334 are repeated in conjunction by the controller 500, whereby the cell material W can be intermittently drawn out in predetermined lengths, corresponding to the lengths of the cut out positive electrodes 20.

Figure 15:
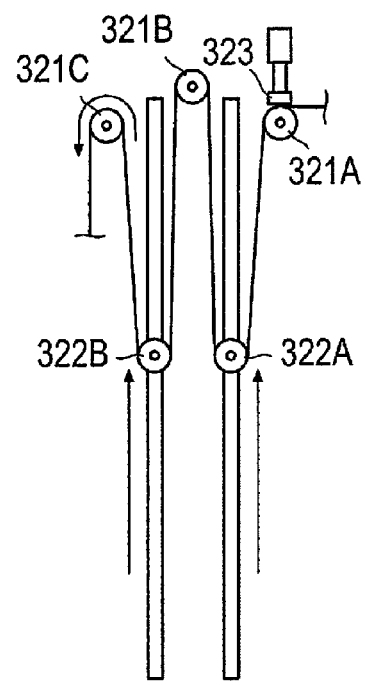
FIG. 15 is a plan view showing when the cell material is supplied to the downstream side from the buffer section.
Figure 16:
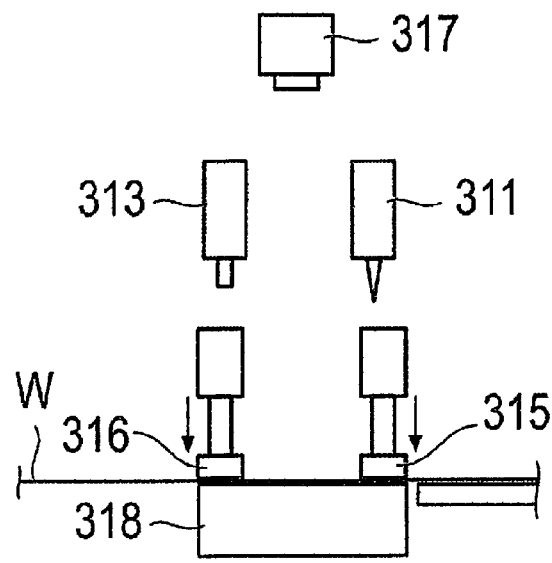
FIG. 16 is a plan view showing when the cell material is fixed in place in order for an automatic joining section to perform automatic joining.

As the cell material W is repeatedly intermittently drawn out from the supply roll 110, the amount of cell material W on the supply roll 110 decreases. When the ending edge mark M of the cell material W reaches the imaging range of the first imaging part 317, the controller 500, which receives signals from the first imaging part 317, assesses that it is time to replace the supply roll 110, and activates the buffer section clamp 323 to fix the cell material W in place as shown in FIG. 14. Furthermore, the controller 500 activates the joining section first clamp 315 and the joining section second clamp 316 to fix the cell material W in place as shown in FIG. 16. The buffer section clamp 323 continues to fix the cell material W in place until the joining of the cell material W is complete in the automatic joining section 310. Therefore, it becomes impossible for the cell material W to be drawn out from the supply roll 110 even if the draw-out roller 332 of the draw-out section 330 is lowered, but the needed cell material W can be supplied from the buffer section 320 by raising the buffer rollers 322A, 322B to shorten the conveying route as shown in FIG. 15. The cutting out of positive electrodes 20 can thereby be continued without stopping in the cutting section 400 even when the supply roll 110 is replaced. Because there are two buffer rollers 322A, 322B provided in the present embodiment, a longer amount of cell material W can be supplied from the buffer section 320 than when there is one, and the time of replacing the supply roll 110 can continue longer.

Figure 17:
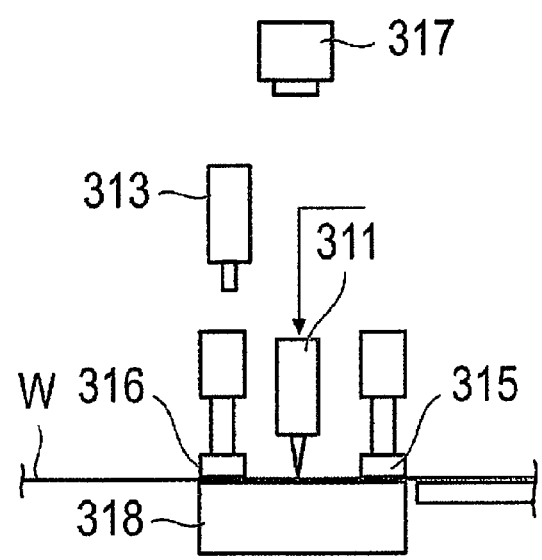
FIG. 17 is a plan view showing when the cell material is cut in the automatic joining section.
Figure 18:
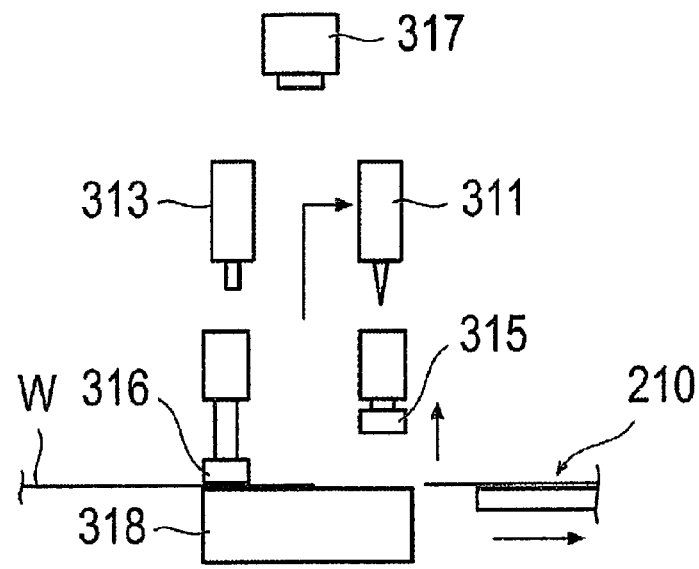
FIG. 18 is a plan view of the automatic joining section showing when the previous supply roll is conveyed out.

While positive electrodes 20 continue to be cut out, the cell material W is cut by the cutting part 311 in the automatic joining section 310 in a state in which the cell material W is fixed in place by the joining section first clamp 315 and the joining section second clamp 316, as shown in FIG. 17. The fixing of the cell material W by the joining section first clamp 315 is then released as shown in FIG. 18, and the supply roll 110 can be replaced. The fixed state of the cell material W is maintained in the joining section second clamp 316.

Next, the braking rollers 231 are raised by the roller movement mechanism 232, and the moving base 221A positioned in the connecting position A2 is moved to the convey in/out position A1, as shown in FIG. 1. In the convey in/out position A1, another roll support base 210 having a new supply roll 110 installed waits after having been installed in another moving base 221B. Therefore, at the same time that the moving base 221A holding a used up supply roll 110 is moved to the convey in/out position A1, the moving base 221B holding a new supply roll 110 is moved to the connecting position A2, whereby the supply roll 110 can be replaced in a short amount of time.

Figure 19:
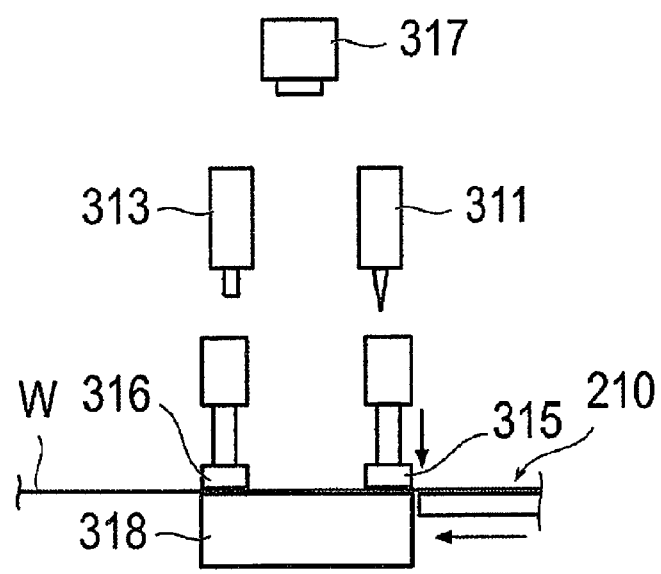

When the moving base 221B holding a new supply roll 110 is positioned in the connecting position A2, the ending edge Wf of the pre-replacement old cell material W and the starting edge Ws of the post-replacement new cell material W are imaged by the first imaging part 317 as shown in FIG. 19. The width-directional misalignment α of the starting edge Ws of the post-replacement cell material W, relative to the ending edge Wf of the pre-replacement cell material W as shown in FIG. 22(A), is specified by the controller 500. The roll position correction means 250 is then activated to move the supply roll 110 in the axial direction, using the specified misalignment α as the correction amount. When the roll position correction means 250 activates, the upper support part 215 moveably supported by the linear guide 217 moves in the roll support base 210, thereby moving the supply roll 110. The width-directional position of the starting edge Ws of the post-replacement cell material W is thereby made to coincide with the ending edge Wf of the pre-replacement cell material W, as shown in FIG. 22(B).

Figure 20:
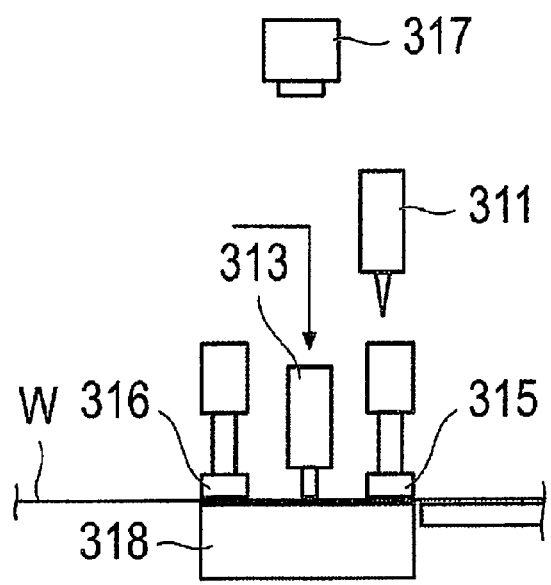
FIG. 20 is a plan view showing when cell materials are joined together in the automatic joining section.

When the width-directional position of the starting edge Ws of the post-replacement cell material W coincides with the ending edge Wf of the pre-replacement cell material W, the joining section first clamp 315 is activated to fix the starting edge Ws of the new cell material W in place, as shown in FIG. 19. The bonding part 313 is then activated to affix and bond tape T between the ending edge Wf of the pre-replacement cell material W and the starting edge Ws of the post-replacement cell material W, as shown in FIGS. 20 and 22(C).

Figure 21:
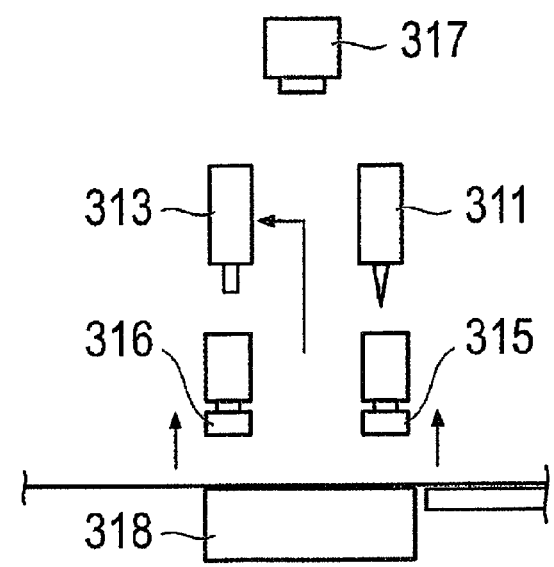
FIG. 21 is a plan view showing when joining is complete in the automatic joining section.
Figure 23:
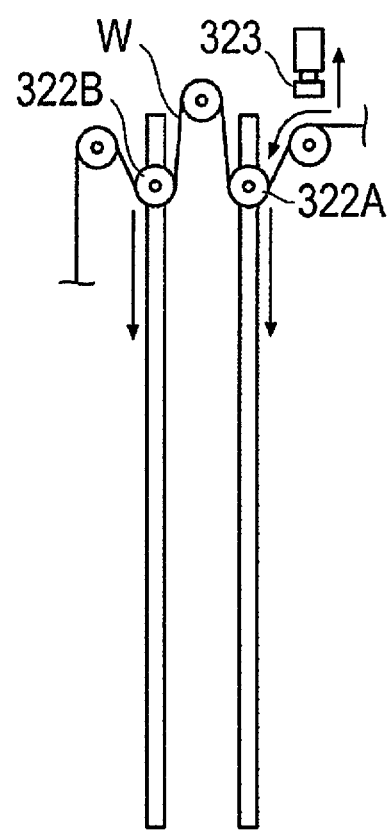
FIG. 23 is a plan view showing when the fixing in place of the cell material by the buffer section clamp is released.

When the joining of the cell materials W together is complete, the fixing of the cell material W by the joining section first clamp 315 and the joining section second clamp 316 is released as shown in FIG. 21, and the fixing of the cell material W by the buffer section clamp 323 is also released as shown in FIG. 23. All fixing of the cell material W by the plurality of clamps provided between the supply roll 110 and the draw-out section 330 is thereby released, and the cell material W can be drawn out from the supply roll 110.

The positive electrodes 20 are cut out in the cutting section 400 while the cell material W is repeatedly drawn out from the supply roll 110 by the draw-out section 330, but during this time, the buffer rollers 322A, 322B, which have moved upward, are moved until they reach the lower end. The movement of the buffer rollers 322A, 322B takes place over the course of multiple draw-out actions by the draw-out section 330. Factors such as the time required and timing of the movement of the buffer rollers 322A, 322B to the lower end are not particularly limited as long as the movement is complete by the time the next supply roll 110 is replaced.

When the area bonded by the automatic joining section 310 reaches the imaging range of the second imaging part 450, the conveying-directional interval L1 of an active material part W1 is specified by the controller 500 from the captured image, as shown in FIG. 22(C). When an interval L2 of an active material part including an area joined by the automatic joining section 310 is detected, the area is specified to be a joined area from the difference with the interval L1. According to the specified conveying-directional intervals L1, L2, the distance conveyed by the suction-holding convey-out part 440 is altered, and the following cell material W can be cut at the proper position. The portion including the area joined by the automatic joining section 310 is removed in a subsequent step.

In a subsequent step, a cut out positive electrode 20 is stacked on a negative electrode 30 with the separator 40 in between, constituting a stacked electrode assembly 11.

As described above, the present embodiment comprises a supply roll 110 on which the cell material W is wound, a corrective roller 340, and another roller. The corrective roller 340 holds the cell material W fed out from the supply roll 110 so as to allow the cell material to be conveyed while bending one surface of the cell material W that lies against the outer peripheral side of the supply roll 110 into a concave shape, and the other roller holds the cell material W so as to allow the cell material to be conveyed while bending the other surface, which is different from the one surface, into a concave shape. The radius of curvature of the surface of the corrective roller 340 that is in contact with the cell material W is less than the radius of curvature of the surface of the other roller that is in contact with the cell material W. Therefore, the cell material W in contact with the corrective roller 340 bends in the opposite direction of the creases with a smaller radius of curvature than when in contact with the other roller (e.g. an additional holding part 345) which is in contact with the other surface, the creases in the cell material W are corrected, and the accuracy of processing following cell material W is improved.

In the present embodiment, the corrective roller 340 is provided between the draw-out section 330 for drawing out the cell material W from the supply roll 110 by pulling the cell material W, and the cutting section 400 for processing the cell material W, the cutting section being provided downstream of the draw-out section 330. Therefore, the cell material W can be corrected immediately before being processed in the cutting section 400, and the effect of creases on processing can be reduced to the fullest extent possible.

In the cell material W held on the corrective roller 340, tension is constantly maintained by the draw-out section 330 throughout all the time periods of the repeated intermittent draw-out actions. Therefore, there is no sagging in the cell material W on the corrective roller 340, and tension can be satisfactorily applied to correct creases.

Because the corrective roller 340 is in contact with the cell material W in a range of 90 to 180 degrees on the outer peripheral surface, the cell material W can be bent over a wide angular range of the corrective roller 340, and the effect of correcting creases in the cell material W can be further improved.

The present invention is not limited to the embodiment described above, and can be modified as appropriate. For example, the cell need not be a secondary cell. The present invention may also be applied to the conveying of negative electrodes 30 or separators 40, rather than the conveying of positive electrodes 20.

There may also be two or more corrective rollers 340. The corrective rollers 340 may be provided in locations other than between the draw-out section 330 and the cutting section 400.

All of the rollers in contact with the cell material W, such as the corrective roller 340, the buffer rollers 322A, 322B and the draw-out roller 332, are capable of rotating, but non-rotatable members may be used as holding parts in place of the rollers if their surfaces have low friction and allow the cell material W to slide smoothly over.

The invention claimed is:

1. A conveyor comprising:
a supply roll rotatably arranged and configured to support a belt-shaped cell material for an electrode or a separator;
a draw-out section arranged with respect to the supply roll to draw out the cell material from the supply roll by pulling the cell material;
a processing section arranged with respect to the supply roll to process the cell material, the processing section being provided farther downstream in a cell material conveying direction than the draw-out section and including a punching section for cutting the electrode or the separator from the cell material;
a corrective holding part configured to conveyably hold the cell material fed out from the supply roll while bending a first side surface of the cell material that is an outer peripheral side of the supply roll into a concave shape, the corrective holding part being provided between the draw-out section and the processing section with respect to the cell material conveying direction; and
an additional holding part configured to conveyably hold the cell material while bending a second side surface of the cell material into a concave shape, the first side surface being different from the second side surface; the corrective holding part including a first curved contact surface that is in contact with the first side surface of the cell material, the additional holding part including a second curved contact surface that is in contact with the second side surface of the cell material, the corrective holding part having a radius that is less than a radius of the additional holding part.

2. The conveyor according to claim 1, wherein
the draw-out section is configured to intermittently draw out and convey the cell material; and
the corrective holding part is configured such that tension is applied to the cell material held in the corrective holding part throughout all time periods of repeated draw-out actions.

3. The conveyor according to claim 1, wherein
the corrective holding part is in contact with the cell material in a range of 90 to 180 degrees of the outer peripheral surface.

4. A conveying method comprising:
feeding out and conveying a belt-shaped cell material from a supply roll on which the cell material is wound, the cell material being a material for an electrode or a separator, the conveying of the cell material from the supply roll being accomplished by drawing out the cell material from the supply roll by pulling the cell material using a draw-out section;
processing the cell material using a processing section, the processing section being provided farther downstream in a cell material conveying direction than the draw-out section, the processing of the cell material including cutting the electrode or the separator from the cell material;
using a corrective holding part to hold and convey the cell material, which is fed out from the supply roll, while a first curved contact surface of the corrective holding part contacts and bends a first side surface of the cell material that is an outer peripheral side of the supply roll into a concave shape, the corrective holding part being disposed between the draw-out section and the processing section with respect to the cell material conveying direction; and
using an additional holding part to hold and convey the cell material, which is fed out from the supply roll, while a second curved contact surface of the additional holding part contacts and bends a second side surface of the cell material into a concave shape, the first side surface being different from second side surface, the corrective holding part having a radius of curvature that is less than a radius of the additional holding part.

5. The conveying method according to claim 4, wherein
the cell material is intermittently drawn out and conveyed by the draw-out section, and tension is applied to the cell material held in the corrective holding part throughout all the time periods of the repeated draw-out actions.

6. The conveying method according to claim 4, wherein
the cell material is kept in contact with the corrective holding part in a range of 90 to 180 degrees of the outer peripheral surface.

7. The conveyor according to claim 1, wherein
the corrective holding part and the additional holding part are arranged without a further holding part located therebetween.

* * * * *